(12) United States Patent
Wu et al.

(10) Patent No.: US 11,817,574 B2
(45) Date of Patent: Nov. 14, 2023

(54) CARBON-SILICON THREE-DIMENSIONAL STRUCTURAL COMPOSITE MATERIAL AND PREPARATION METHOD THEREOF

(71) Applicant: XIAMEN HITHIUM ENERGY STORAGE TECHNOLOGY CO., LTD., Fujian (CN)

(72) Inventors: Xuelian Wu, Fujian (CN); Enqiang Zhang, Fujian (CN)

(73) Assignee: XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 17/875,611

(22) Filed: Jul. 28, 2022

(65) Prior Publication Data
US 2023/0033233 A1 Feb. 2, 2023

(30) Foreign Application Priority Data
Jul. 29, 2021 (CN) .......................... 202110863229.8

(51) Int. Cl.
| | |
|---|---|
| *H01M 4/36* | (2006.01) |
| *C01B 32/184* | (2017.01) |
| *C01B 32/198* | (2017.01) |
| *H01M 4/38* | (2006.01) |
| *H01M 4/587* | (2010.01) |

(Continued)

(52) U.S. Cl.
CPC .......... *H01M 4/364* (2013.01); *C01B 32/184* (2017.08); *C01B 32/198* (2017.08); *H01M 4/386* (2013.01); *H01M 4/587* (2013.01); *B82Y 30/00* (2013.01); *B82Y 40/00* (2013.01); *C01B 2204/22* (2013.01)

(58) Field of Classification Search
CPC ...... H01M 4/364; H01M 4/386; H01M 4/587; C01B 32/184; C01B 32/198; C01B 2204/22; B82Y 30/00; B82Y 40/00
See application file for complete search history.

(56) References Cited

FOREIGN PATENT DOCUMENTS

| | | |
|---|---|---|
| CN | 101924211 A | 12/2010 |
| CN | 102496719 A | 6/2012 |
| CN | 104993110 A | 10/2015 |

(Continued)

OTHER PUBLICATIONS

English Translation of CN108598420 (Year: 2018).*

(Continued)

*Primary Examiner* — Andrew J. Oyer

(57) ABSTRACT

Provided are a carbon-silicon three-dimensional structural composite material and a preparation method thereof. The preparation method includes: dissolving graphene quantum dots in ultrapure water, dropwise adding a $CuCl_2$ or $ZnCl_2$ solution, and performing oscillation to generate a mixed emulsifier; mixing the mixed emulsifier with a graphite oxide aqueous solution and a cyclohexane solution containing nanosilicon spheres, and performing homogenization to form a uniform oil-in-water emulsion; adding hydrazine hydrate into the obtained emulsion for reduction, and performing a hydrothermal reaction to obtain a reduced emulsion; and freeze-drying the reduced emulsion, performing washing with a washing liquid, and performing vacuum drying to obtain a carbon-silicon three-dimensional structural composite material.

18 Claims, 1 Drawing Sheet

(51) Int. Cl.
*B82Y 30/00* (2011.01)
*B82Y 40/00* (2011.01)

(56) References Cited

FOREIGN PATENT DOCUMENTS

| CN | 105742586 A | 7/2016 |
| --- | --- | --- |
| CN | 108598420 A | 9/2018 |
| CN | 109309221 A | 2/2019 |
| CN | 109950492 A | 6/2019 |
| KR | 20160024324 A | 3/2016 |

OTHER PUBLICATIONS

First Office Action from corresponding Chinese Application No. 202110863229.8, dated Apr. 7, 2022. English translation attached.
Grant Notice from corresponding Chinese Application No. 202110863229.8, dated Jul. 4, 2022. English translation attached.
Yang, Kai et al."Structure and electrochemical performance of Si/graphene nanocomposites prepared by high temperature hydrogen reduction" «Materials Science and Engineering of Powder Metallurgy» , vol. 21, No. 6,Dec. 15, 2016.
Gao, Yang et al."Preparation and electrochemical performance of hollow silicon sphere / graphene composite electrodes", «Journal of Shanghai University (Natural Science Edition)» vol. 26,No. 4, Aug. 31, 2020.
Xu,Yi et al."Highly conductive C-Si@G nanocomposite as a high-performance anode material for Li-ion batteries", «Electrochimica Acta» , Nov. 5, 2018.

\* cited by examiner

CARBON-SILICON THREE-DIMENSIONAL STRUCTURAL COMPOSITE MATERIAL AND PREPARATION METHOD THEREOF

TECHNICAL FIELD

The present disclosure relates to the field of electrode materials, in particular to a carbon-silicon three-dimensional structural composite material and a preparation method thereof.

BACKGROUND

A silicon material is considered as the most promising next-generation electrode material because of its high capacity. However, during the process of charging and discharging, the volume of silicon changes greatly, which leads to cracking and collapse of the electrode material structure; and an SEI film on the surface of the material has a side reaction with an electrolyte at the same time, resulting in decrease of capacity and service life, etc. At present, an existing improvement technology lies in that silicon-carbon composite materials are prepared to reduce volume expansion of silicon and to reduce the loss of the material capacity.

Chinese invention patent with the Application No. CN2010102.56875.X discloses a graphene/silicon lithium-ion battery negative electrode material and a preparation method thereof. According to this preparation method, self-supporting graphene/silicon composite film materials with different proportions can be prepared by mixing graphene oxide with nanosilicon powder in different proportions, performing ultrasonic dispersion, performing suction filtering or direct drying to obtain cakes/films, and baking them in a reducing atmosphere. Although this preparation method can alleviate the volume expansion caused by the silicon material to a certain extent, an overall specific capacity of the material is low. In an existing preparation method of a silicon-carbon composite material, a silicon material and a carbon material are assembled or mixed to relieve the volume expansion of the silicon material and improve the gram capacity of the material. However, compounding on the surface will hinder conduction of electrons and ions, increase polarization of charging and discharging, and then affect a cycle life and rate performance of the material.

SUMMARY

The purpose of the present disclosure is to provide a carbon-silicon three-dimensional structure composite material and a preparation method thereof, which solve the problems of volume expansion of a silicon material and cracking and collapse of an electrode material structure.

The present disclosure is realized by the following technical solutions:

A preparation method of a carbon-silicon three-dimensional structural composite material includes the following steps:

a first step of dissolving 0.004 g to 0.006 g of graphene quantum dots in 4 ml to 6 ml of ultrapure water, dropwise adding 0.65 ml to 0.85 ml of a $CuCl_2$ or $ZnCl_2$ solution having a concentration of 0.2 mol/ml to 0.3 mol/ml, and performing oscillation to generate a mixed emulsifier;

a second step of mixing the mixed emulsifier obtained in the first step with 10 ml to 20 ml of a graphite oxide aqueous solution having a concentration of 10 mg/ml to 20 mg/ml and 10 ml to 20 ml of a cyclohexane solution containing 0.1 g to 0.2 g of nanosilicon spheres, and performing homogenization for 20 s to 30 s to form a uniform oil-in-water emulsion;

a third step of adding 0.9 g to 1.2 g of hydrazine hydrate into the emulsion obtained in the second step for reduction, and performing a by reaction to obtain a reduced emulsion; and a fourth step of freeze-drying the reduced emulsion obtained in the third step, and performing washing with a washing liquid, and performing vacuum drying, to obtain the carbon-silicon three-dimensional structural composite material.

According to the technical solution of the present disclosure, the graphene quantum dots are utilized with their surface activity for the first time to be mixed and react with transition metal chloride to prepare an emulsifier; the prepared mixed emulsifier plays an emulsifying role in the reaction between the graphite oxide aqueous solution and the nanosilicon sphere solution; the graphite oxide (graphene oxide) is reduced into graphene by using a reducing agent, and enters an oil phase from the aqueous phase; while the graphite oxide is being reduced, the silicon spheres are wrapped, so that the silicon spheres are embedded between the layers of the graphene, thereby obtaining the carbon-silicon three-dimensional structural composite material.

In some embodiments, the graphene quantum dots in the first step are prepared by: uniformly dissolving 1 g of citric acid and 0.03 g of histidine in 20 ml of ultrapure water under a heating condition of a 40° C. to 50° C.; water bath, performing pyrolysis at 180° C. for 3 h to form a mixture, filtering the mixture, pouring a filtrate in a dialysis bag for dialysis treatment, and performing freeze-drying at −40° C. after the dialysis treatment to obtain the graphene quantum dots.

The graphene quantum dots of the present disclosure are prepared by a hydrothermal method, which is simple in process and suitable for large-scale industrial application.

In some embodiments, the graphite oxide in the second step is prepared by a Hummer method.

In some embodiments, the nanosilicon spheres in the second step have a particle diameter denoted by r, where r satisfies 20 nm≤r≤120 nm.

In some embodiments, the cyclohexane solution containing the nanosilicon spheres in the second step is prepared by: adding the nanosilicon spheres into a mixed solution prepared by acetone, ethanol, and water according to a volume ratio of 1:1:1, performing ultrasonic treatment for 30 min, performing washing with ethanol and ultrapure water for three times after the ultrasonic treatment, performing centrifugal separation, taking a lower layer of solid, performing vacuum drying at 60° C. to obtain treated nanosilicon spheres, and uniformly dispersing 0.1 g to 0.2 g of the treated nanosilicon spheres in 10 ml to 20 ml of a cyclohexane solution.

In some embodiments, the hydrothermal reaction in the third step is performed at a temperature of 60° C. to 65° C. for 8 h to 10 h.

In some embodiments, the freeze-drying in the fourth step is performed at a temperature of −40° C.

In some embodiments, the washing liquid in the fourth step is ethanol.

In some embodiments, the vacuum drying in the fourth step is performed at a temperature of 60° C.

The present disclosure further provides a carbon-silicon three-dimensional structural composite material obtained by the above preparation method of the carbon-silicon three-dimensional structural composite material; and an overall size of the obtained carbon-silicon composite material obtained through the wrapping is 3 μm to 10 μm.

Compared with the related art, the present disclosure has the following advantages and beneficial effects:

According to the present disclosure, the outside of a silicon material is wrapped with a carbon material, so that the silicon spheres are embedded between the layers of the carbon material; when the volume of the silicon material changes drastically, good elasticity and dispersed stress of the three-dimensional network structure can effectively relieve the material cracking caused by volume expansion, reduce the loss of active materials, avoid side reactions, reduce consumption of active lithium ions in an electrolyte, and thus improve a cycle life of the material.

Meanwhile, the network structure increases electron transport channels, strengthens electrical connection between the silicon materials, increases an electrical transmission rate, improves conductivity of the material itself, and improves the rate performance of the material.

BRIEF DESCRIPTION OF DRAWING

The drawings illustrated here are used to provide a further understanding of embodiments of the present disclosure, and form a part of the present disclosure, but do not constitute a limitation on the embodiments of the present disclosure.

DESCRIPTION OF EMBODIMENTS

Figure 1:
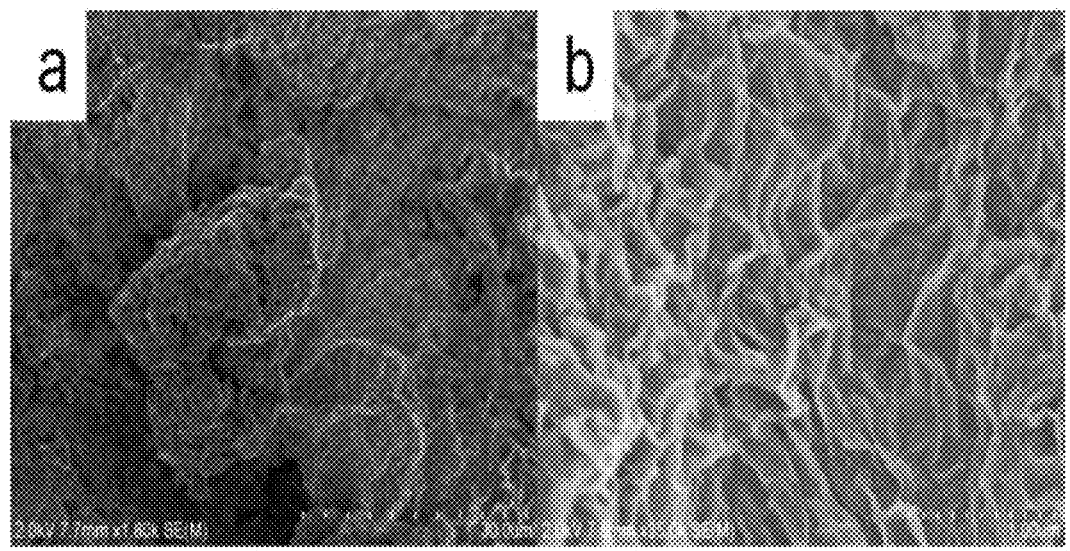
FIG. 1 is an SEM diagram of a carbon-silicon three-dimensional structural composite material prepared in Embodiment 2, in which a shows an overall morphology of the carbon-silicon composite material; and b shows a morphology of a surface, which is wrapped by graphene, of the carbon-silicon composite material.

In order to make the purpose, technical solution and advantages of the present disclosure clearer, the present disclosure will be described in further detail below with reference to embodiments and drawings. Illustrative implementations of the present disclosure and descriptions thereof are only used to explain the present disclosure, but not to limit the present disclosure.

Embodiment 1

Material Preparation:
a. nanosilicon sphere treatment: the particle diameter r of nanosilicon spheres was 20 nm; the nanosilicon spheres were added into a mixed solution prepared by acetone, ethanol and water according to a volume ratio of 1:1:1; washing was performed with ethanol and ultrapure water for three times after ultrasonic treatment for 30 min; centrifugal separation was performed to take the lower layer of solid; vacuum drying was performed at 60° C. to obtain treated nanosilicon spheres; and 0.1 g of the treated nanosilicon spheres was uniformly dispersed in 10 ml of a cyclohexane solution;
b. 1 g of citric acid and 0.03 g of histidine were uniformly dissolved in 20 ml of ultrapure water under a heating condition of a 40 to 50° C. water bath; pyrolysis was performed at 180° C. for 3 h to form a mixture; the mixture was filtered; a filtrate was poured in a dialysis bag for dialysis treatment; and freeze-drying was performed at −40° C. after the dialysis treatment to obtain graphene quantum dots;
c. graphite oxide was prepared by a Hummer method; and the concentration of a graphite oxide aqueous solution was 10 mg/ml.

Preparation Steps:
uniformly dissolving 0.004 g of the graphene quantum dots in 4 ml of ultrapure water, dropwise adding 0.65 ml of a 0.2 mol/ml $CuCl_2$ solution, and performing oscillation to generate a mixed emulsifier;
mixing the obtained mixed emulsifier with 10 ml of the graphite oxide aqueous solution having a concentration of 10 mg/ml and 10 ml of the cyclohexane solution containing 0.1 g of the nanosilicon spheres, and performing homogenization for 20 s to form a uniform oil-in-water emulsion;
adding 0.9 g of hydrazine hydrate into the obtained emulsion in three times for reduction; and performing a hydrothermal reaction at 60° C. for 8 h to obtain a reduced emulsion;
freeze-drying the obtained reduced emulsion at −40° C., performing washing with ethanol for three times, and performing vacuum drying at 60° C. to obtain a carbon-silicon three-dimensional structural composite material.

Embodiment 2

Material Preparation:
a. nanosilicon sphere treatment: the particle diameter r of nanosilicon spheres was 50 nm; the nanosilicon spheres were added into a mixed solution prepared by acetone, ethanol and water according to a volume ratio of 1:1:1; washing was performed with ethanol and ultrapure water for three times after ultrasonic treatment for 30 min; centrifugal separation was performed to take the lower layer of solid; vacuum drying was performed at 60° C. to obtain treated nanosilicon spheres; and 0.15 g of the treated nanosilicon spheres was uniformly dispersed in 15 ml of a cyclohexane solution;
b. 1 g of citric acid and 0.03 g of histidine were uniformly dissolved in 20 ml of ultrapure water under a heating condition of a 45° C. water bath; pyrolysis was performed at 180° C. for 3 h to form a mixture; the mixture was filtered; a filtrate was poured in a dialysis bag for dialysis treatment; and freeze-drying was performed at −40° C. after the dialysis treatment to obtain graphene quantum dots;
c. graphite oxide was prepared by a Hummer method; and the concentration of a graphite oxide aqueous solution was 15 mg/ml.

Preparation Steps:
uniformly dissolving 0.005 g of the graphene quantum dots in 4 to 6 ml of ultrapure water, dropwise adding 0.75 ml of 0.25 mol/ml $CuCl_2$ solution, and performing oscillation to generate a mixed emulsifier;
mixing the obtained mixed emulsifier with 15 ml of the graphite oxide aqueous solution with a concentration of 15 mg/ml and 15 ml of cyclohexane solution containing 0.15 g of nanosilicon spheres, and performing homogenization on the obtained mixture for 25 s to form a uniform oil-in-water emulsion;

adding 0.9 g of hydrazine hydrate into the obtained emulsion in three times for reduction, and performing a hydrothermal reaction at 63° C. for 9 h to obtain a reduced emulsion; and freeze-drying the obtained reduced emulsion at −40° C., performing washing with ethanol for three times, and performing vacuum drying at 60° C. to obtain a carbon-silicon three-dimensional structural composite material.

Embodiment 3

Material Preparation:
a. nanosilicon sphere treatment: the particle diameter r of nanosilicon spheres was 120 nm; the nanosilicon spheres were added into a mixed solution prepared by acetone, ethanol and water according to a volume ratio of 1:1:1; washing was performed with ethanol and ultrapure water for three times after ultrasonic treatment for 30 min; centrifugal separation was performed to take the lower layer of solid; vacuum drying was performed at 60° C. to obtain treated nanosilicon spheres; and 0.2 g of the treated nanosilicon spheres was uniformly dispersed in 20 ml of a cyclohexane solution;
b. 1 g of citric acid and 0.03 g of histidine were uniformly dissolved in 20 ml of ultrapure water under a heating condition of a 50° C. water bath; pyrolysis was performed at 180° C. for 3 h to form a mixture; the mixture was filtered; a filtrate was poured in a dialysis bag for dialysis treatment; and freeze-drying was performed at −40° C. after the dialysis treatment to obtain graphene quantum dots;
c. graphite oxide was prepared by a Hummer method; and the concentration of a graphite oxide aqueous solution was 20 mg/ml.

Preparation Steps:
uniformly dissolving 0.006 g of the graphene quantum dots in 6 ml of ultrapure water, adding 0.85 ml of 0.3 mol/ml $ZnCl_2$ solution, and performing oscillation to generate a mixed emulsifier;

mixing the obtained mixed emulsifier with 20 ml of the graphite oxide aqueous solution with a concentration of 20 mg/ml and 20 ml of the cyclohexane solution containing 0.2 g of nanosilicon spheres, and performing homogenization on the obtained mixture for 30 s to form a uniform oil-in-water emulsion;

adding 1.2 g of hydrazine hydrate into the obtained emulsion in three times for reduction, and performing a hydrothermal reaction at 65° C. for 10 h to obtain a reduced emulsion; and freeze-drying the obtained reduced emulsion under −40° C. performing washing with ethanol for three times, and performing vacuum drying at 60° C. to obtain a carbon-silicon three-dimensional structural composite material.

FIG. 1 is an SEM diagram of a carbon-silicon three-dimensional structural composite material prepared in Embodiment 2, in which picture a shows an overall morphology of the carbon-silicon composite material; and picture b shows a morphology of a surface, which is wrapped with graphene, of the carbon-silicon composite material. As shown in picture a, the surface of the silicon sphere is wrapped with a layer of substance; and the overall wrapped structure is uniform. The overall size of the wrapped composite material is between 3 µm and 10 µm. The surface morphology of the object in picture b assists in verifying the wrapped structure of graphene on the surface of the material.

Figure 2:
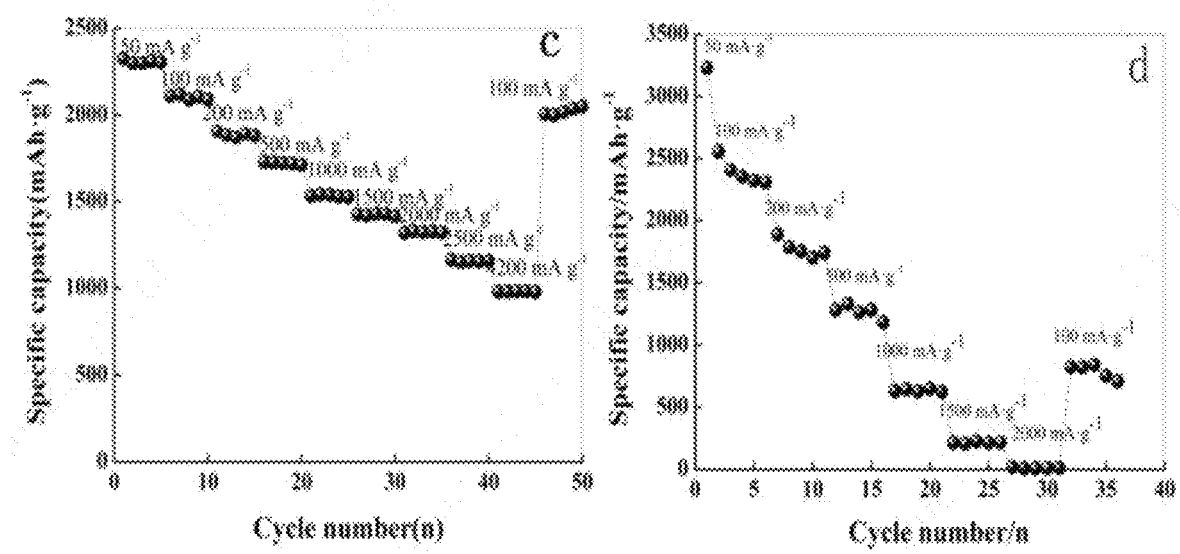
FIG. 2 shows comparison of electrode material specific capacities of a carbon-silicon three-dimensional structural composite material prepared in Embodiment 2 and an existing pure silicon material at different current densities, in which c shows the carbon-silicon three-dimensional structural composite material of the present disclosure; and d shows a pure silicon material electrode.

FIG. 2 shows comparison of electrode material specific capacities at different current densities, in which, graph c shows an electrode made of the carbon-silicon composite material prepared in Embodiment 2; and graph d shows a pure silicon material electrode. As shown from comparison of curves, the specific capacity of the pure silicon electrode decreases rapidly with the increase of the current density under different current densities, while the specific capacity of the carbon-silicon composite material electrode obtained by the present solution decreases gently. Mechanical properties of the graphene material of the present solution can solve the problem of material cracking due to volume expansion of silicon spheres, help reduce the loss of the high-capacity nanosilicon sphere material and improve cycle performance of the electrode material. Meanwhile, the composite material has improved charge transport performance and ion diffusion ability of the silicon spheres, and has improved rate performance of the electrode material.

The above-mentioned specific implementations further explained the purpose, technical solutions and beneficial effects of the present disclosure in detail. It should be understood that the above are only specific implementations of the present disclosure, and are not intended to limit the scope of protection of the present disclosure. Any modifications, equivalent substitutions, improvements, etc. made within the ideas and principle of the present disclosure should be included in the scope of protection of the present disclosure.

What is claimed is:

1. A preparation method of a carbon-silicon three-dimensional structural composite material, comprising the following steps:
   a first step of dissolving 0.004 g to 0.006 g of graphene quantum dots in 4 ml to 6 ml of ultrapure water, dropwise adding 0.65 ml to 0.85 ml of a $CuCl_2$ or $ZnCl_2$ solution having a concentration of 0.2 mol/ml to 0.3 mol/ml, and performing oscillation to generate a mixed emulsifier;
   a second step of mixing the mixed emulsifier obtained in the first step with 10 ml to 20 ml of a graphite oxide aqueous solution having a concentration of 10 mg/ml to 20 mg/ml and 10 ml to 20 ml of a cyclohexane solution containing 0.1 g to 0.2 g of nanosilicon spheres, and performing homogenization for 20 s to 30 s to form a uniform oil-in-water emulsion;
   a third step of adding 0.9 g to 1.2 g of hydrazine hydrate into the emulsion obtained in the second step for reduction, and performing a hydrothermal reaction to obtain a reduced emulsion; and
   a fourth step of freeze-drying the reduced emulsion obtained in the third step, performing washing with a washing liquid, and performing vacuum drying, to obtain the carbon-silicon three-dimensional structural composite material.

2. The preparation method of the carbon-silicon three-dimensional structural composite material according to claim 1, wherein the graphene quantum dots in the first step are prepared by:
   uniformly dissolving 1 g of citric acid and 0.03 g of histidine in 20 ml of ultrapure water under a heating condition of a 40° C. to 50° C. water bath,
   performing pyrolysis at 180° C. for 3 h to form a mixture,
   filtering the mixture,
   pouring a filtrate in a dialysis bag for dialysis treatment, and performing freeze-drying at −40° C. after the dialysis treatment to obtain the graphene quantum dots.

3. The preparation method of the carbon-silicon three-dimensional structural composite material according to claim 1, wherein the graphite oxide in the second step is prepared by a Hummer method.

4. The preparation method of the carbon-silicon three-dimensional structural composite material according to claim 1, wherein the nanosilicon spheres in the second step have a particle diameter denoted by r, where r satisfies 20 mn≤r≤120 nm.

5. The preparation method of the carbon-silicon three-dimensional structural composite material according to claim 1, wherein the cyclohexane solution containing the nanosilicon spheres in the second step is prepared by:
adding the nanosilicon spheres into a mixed solution prepared by acetone, ethanol, and water according to a ratio of 1:1:1,
performing ultrasonic treatment for 30 min,
performing washing with ethanol and ultrapure water for three times after the ultrasonic treatment, performing centrifugal separation, and taking a lower layer of solid,
performing vacuum drying at 60° C. to obtain treated silicon spheres, and
uniformly dispersing 0.1 g to 0.2 g of the treated nanosilicon spheres in 10 ml to 20 ml of a cyclohexane solution.

6. The preparation method of the carbon-silicon three-dimensional structural composite material according to claim 1, wherein the hydrothermal reaction in the third step is performed at a temperature of 60° C. to 65° C. for 8 h to 10 h.

7. The preparation method of the carbon-silicon three-dimensional structural composite material according to claim 1, wherein the freeze-drying in the fourth step is performed at a temperature of −40° C.

8. The preparation method of the carbon-silicon three-dimensional structural composite material according to claim 1, wherein the washing liquid in the fourth step is ethanol.

9. The preparation method of the carbon-silicon three-dimensional structural composite material according to claim 1, wherein the vacuum drying in the fourth step is performed at a temperature of 60° C.

10. A carbon-silicon three-dimensional structural composite material, obtained by a preparation method of the carbon-silicon three-dimensional structural composite material, the preparation method comprising the following steps:
a first step of dissolving 0.004 g to 0.006 g of graphene quantum dots in 4 ml to 6 ml of ultrapure water, dropwise adding 0.65 ml to 0.85 ml of a $CuCl_2$ or $ZnCl_2$ solution having a concentration of 0.2 mol/ml to 0.3 mol/ml, and performing oscillation to generate a mixed emulsifier;
a second step of mixing the mixed emulsifier obtained in the first step with 10 ml to 20 ml of a graphite oxide aqueous solution having a concentration of 10 mg/ml to 20 mg/ml and 10 ml to 20 ml of a cyclohexane solution containing 0.1 g to 0.2 g of nanosilicon spheres, and performing homogenization for 20 s to 30 s to form a uniform oil-in-water emulsion;
a third step of adding 0.9 g to 1.2 g of hydrazine hydrate into the emulsion obtained in the second step for reduction, and performing a hydrothermal reaction to obtain a reduced emulsion; and
a fourth step of freeze-drying the reduced emulsion obtained in the third step, performing washing with a washing liquid, and performing vacuum drying, to obtain the carbon-silicon three-dimensional structural composite material,
wherein silicon spheres are embedded between layers of graphene in the carbon-silicon three-dimensional structural composite material.

11. The carbon-silicon three-dimensional structural composite material according to claim 10, wherein the graphene quantum dots in the first step are prepared by:
uniformly dissolving 1 g of citric acid and 0.03 g of histidine in 20 ml of ultrapure water under a heating condition of a 40° C. to 50° C. water bath,
performing pyrolysis at 180° C. for 3 h to form a mixture,
filtering the mixture,
pouring a filtrate in a dialysis bag for dialysis treatment, and
performing freeze-drying at −40° C. after the dialysis treatment to obtain the graphene quantum dots.

12. The carbon-silicon three-dimensional structural composite material according to claim 10, wherein the graphite oxide in second step is prepared by a Hummer method.

13. The carbon-silicon three-dimensional structural composite material according to claim 10, wherein the nanosilicon spheres in the second step have a particle diameter denoted by r, where r satisfies 20 nm≤r≤120 nm.

14. The carbon-silicon three-dimensional structural composite material according to claim 10, wherein the cyclohexane solution containing the nanosilicon spheres in the second step is prepared by:
adding the nanosilicon spheres into a mixed solution prepared by acetone, ethanol, and water according to a ratio of 1:1:1,
performing ultrasonic treatment for 30 min,
performing washing with ethanol and ultrapure water for three times after the ultrasonic treatment, performing centrifugal separation, and taking a lower layer of solid,
performing vacuum drying at 60° C. to obtain treated silicon spheres, and
uniformly dispersing 0.1 g to 0.2 g of the treated nanosilicon spheres in 10 ml to 20 ml of a cyclohexane solution.

15. The carbon-silicon three-dimensional structural composite material according to claim 10, wherein the hydrothermal reaction in the third step is performed at a temperature of 60° C. to 65° C. for 8 h to 10 h.

16. The carbon-silicon three-dimensional structural composite material according to claim 10, wherein the freeze-drying in the fourth step is performed at a temperature of −40° C.

17. The carbon-silicon three-dimensional structural composite material according to claim 10, wherein the washing liquid in the fourth step is ethanol.

18. The carbon-silicon three-dimensional structural composite material according to claim 10, wherein the vacuum drying in the fourth step is performed at a temperature of 60° C.

* * * * *